United States Patent [19]
Humblet

[11] Patent Number: 5,207,002
[45] Date of Patent: May 4, 1993

[54] METHOD AND SYSTEM FOR VEHICLE FRAME ALIGNMENT

[76] Inventor: Steven V. Humblet, AV 1570, Marsha La., Woodruff, Wis. 54568

[21] Appl. No.: 853,931

[22] Filed: Mar. 19, 1992

[51] Int. Cl.⁵ ............................................. G01B 5/255
[52] U.S. Cl. ...................................... 33/288; 33/608; 33/DIG. 10; 33/293
[58] Field of Search ................. 33/608, 286, 288, 293, 33/DIG. 10; 356/154, 155

[56] References Cited

U.S. PATENT DOCUMENTS

| | | |
|---|---|---|
| 2,581,021 | 1/1952 | Jacobsen et al. ...................... 33/288 |
| 3,462,845 | 8/1969 | Matthews . |
| 4,031,633 | 6/1977 | Bjork ................................ 33/608 X |
| 4,319,402 | 3/1982 | Martin . |
| 4,383,373 | 5/1983 | Courturier . |
| 4,455,759 | 6/1984 | Coetsier . |
| 4,490,919 | 1/1985 | Feist et al. . |
| 4,578,870 | 4/1986 | Cooke . |
| 4,598,481 | 7/1986 | Donahue . |
| 4,610,093 | 9/1986 | Jarman . |
| 4,630,379 | 12/1986 | Wickmann ........................... 33/288 |
| 4,681,439 | 7/1987 | Shoemaker . |
| 4,958,439 | 9/1990 | Dehn . |
| 5,029,397 | 7/1991 | Palombi ............................... 33/288 |
| 5,058,286 | 10/1991 | Chisum . |

OTHER PUBLICATIONS

Dataliner Laser Measuring System trade publication.
Genesis trade publication.
Laser Beacon 6025 trade publication.

*Primary Examiner*—Harry N. Haroian
*Attorney, Agent, or Firm*—Lockwood, Alex, Fitzgibbon & Cummings

[57] ABSTRACT

A method and system for use in the checking and/or correction of alignment of a vehicle frame, body and various parts thereof which utilize an energy beam generator to direct one or more beams, such as a laser beam, at multiple targets which may be mounted on the vehicle frame, body or specific parts thereof, to establish a horizontal reference centerline and a vertical reference datum line from and/or to which alignment measurements may be made. Such method and system are enhanced by the use of either a unidirectional or sweeping beam to establish a centerline and a sweeping beam to establish a datum line. The beam generating means and targets preferably are located within the confines of a vehicle frame or body with the centerline defining beam and target being centered between undamaged portions of the same vehicle parts from which or to which measurements are to be made.

11 Claims, 4 Drawing Sheets

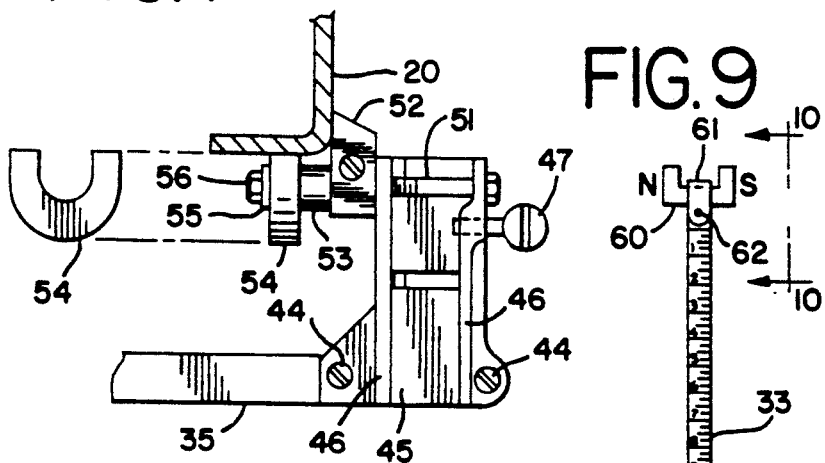
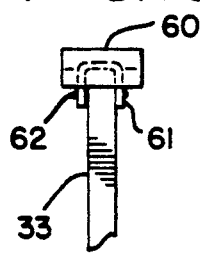
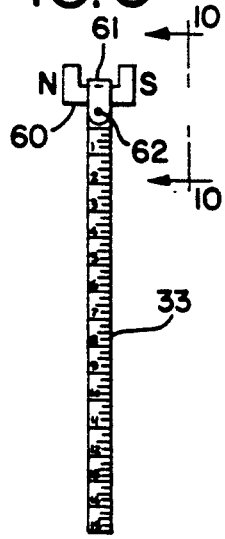
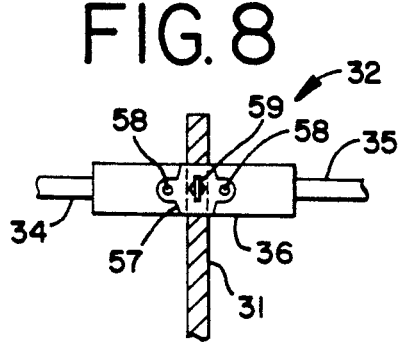
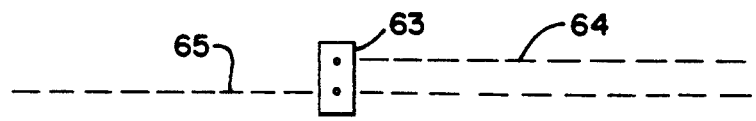
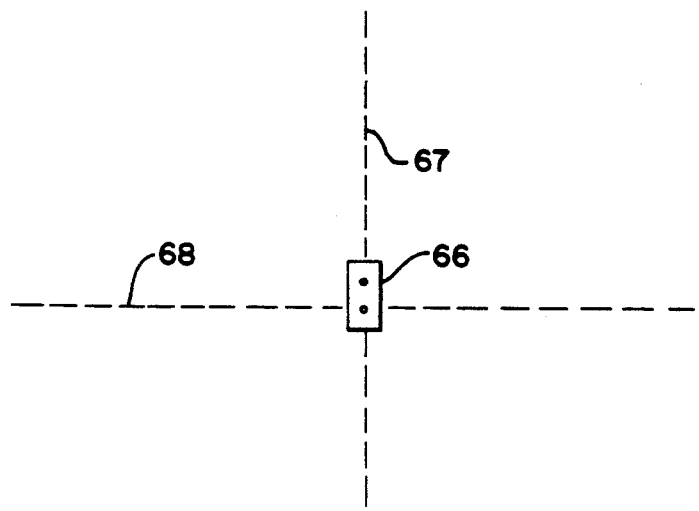

METHOD AND SYSTEM FOR VEHICLE FRAME ALIGNMENT

BACKGROUND OF THE INVENTION

This invention relates to a method and apparatus for checking and/or correcting alignment of a vehicle frame, body or various parts thereof.

Evaluating the alignment of vehicle frame and various associated parts can be rather complicated and time-consuming. A number of different systems are used with varying degrees of success. One approach utilizes one or more chassis gauges mounted on the chassis in centerline relation, each gauge including sighting pins to determine alignment. Such a system involves a painstaking approach if the preferred degree of accuracy is to be realized as, among other drawbacks, the gauges must be repositioned throughout the length of the chassis, thus requiring repeated recalibration.

Other approaches utilize laser beams aimed at targets suspended from the chassis. One such system involves the use of a complex and expensive frame structure extending along an end and side of a chassis slightly below the same and in spaced relation thereto. The corner of this L-shaped structure mounts a laser beam generator and beam splitter which directs a split beam to redirecting mirror units mounted on each leg of the structure. The mirror units in turn are slidable along each leg throughout the width and length of the chassis to permit a split beam to selectively and successively contact targets suspended from the chassis. Such a system is not only very expensive but also is quite time-consuming in operation.

Still another laser based system involves the use of two sweeping lasers which are spaced a predetermined distance from one another and which are mounted independently of a chassis at one end thereof and below the same to permit the sweeping of targets suspended from the chassis. This system relies on the principles of triangulation requiring dependence on a computer and special software. Not only does cost of the system hamper its use, but the fact that the user is totally dependent on a single software source is discouraging.

SUMMARY OF THE INVENTION

The subject invention utilizes a laser beam or equivalent source of energy in a greatly improved manner requiring minimum equipment, calibration and analysis. In one of its preferred forms, a beam capable of selective unidirectional and sweeping operation is suspended from a chassis equidistant from select portions of the chassis to establish both a centerline and datum line in cooperation with centerline and auxiliary targets also suspended from the chassis. Unidirectional beam operation is aimed at a centerline target which is also suspended equidistant from similar select portions of the chassis. The centerline of a horizontal plane is established to permit manual measurements to be taken between the select portions of the chassis and the unidirectional beam. Sweeping beam operation intercepts the auxiliary targets to establish a datum line from which visual or manual vertical measurements relative to various portions of the chassis may be made. Many advantages flow from this system. One advantage of considerable importance is that the system remains operational without recalibration during realignment of a vehicle body, frame or parts thereof to continuously assist in evaluation of such realignment without the need to refer to or rely on any extraneous reference data.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in. the several figures of which like reference numerals identify like elements, and in which:

FIG. 7 is an enlarged fragmentary front elevation of a modified support end for the suspension member;

FIG. 8 is a fragmentary front elevation of a suspension member mounting a centerline target;

FIG. 9 is a front elevation of an auxiliary target;

FIG. 10 is a fragmentary side elevation of the auxiliary target of FIG. 9 as viewed along line 10—10 of FIG. 9; and FIGS. 11 and 12 are diagrammatic illustrations of various modified uses of energy beam generators compatible with the concepts of the invention.

DETAILED DESCRIPTION OF THE INVENTION

Figure 1:
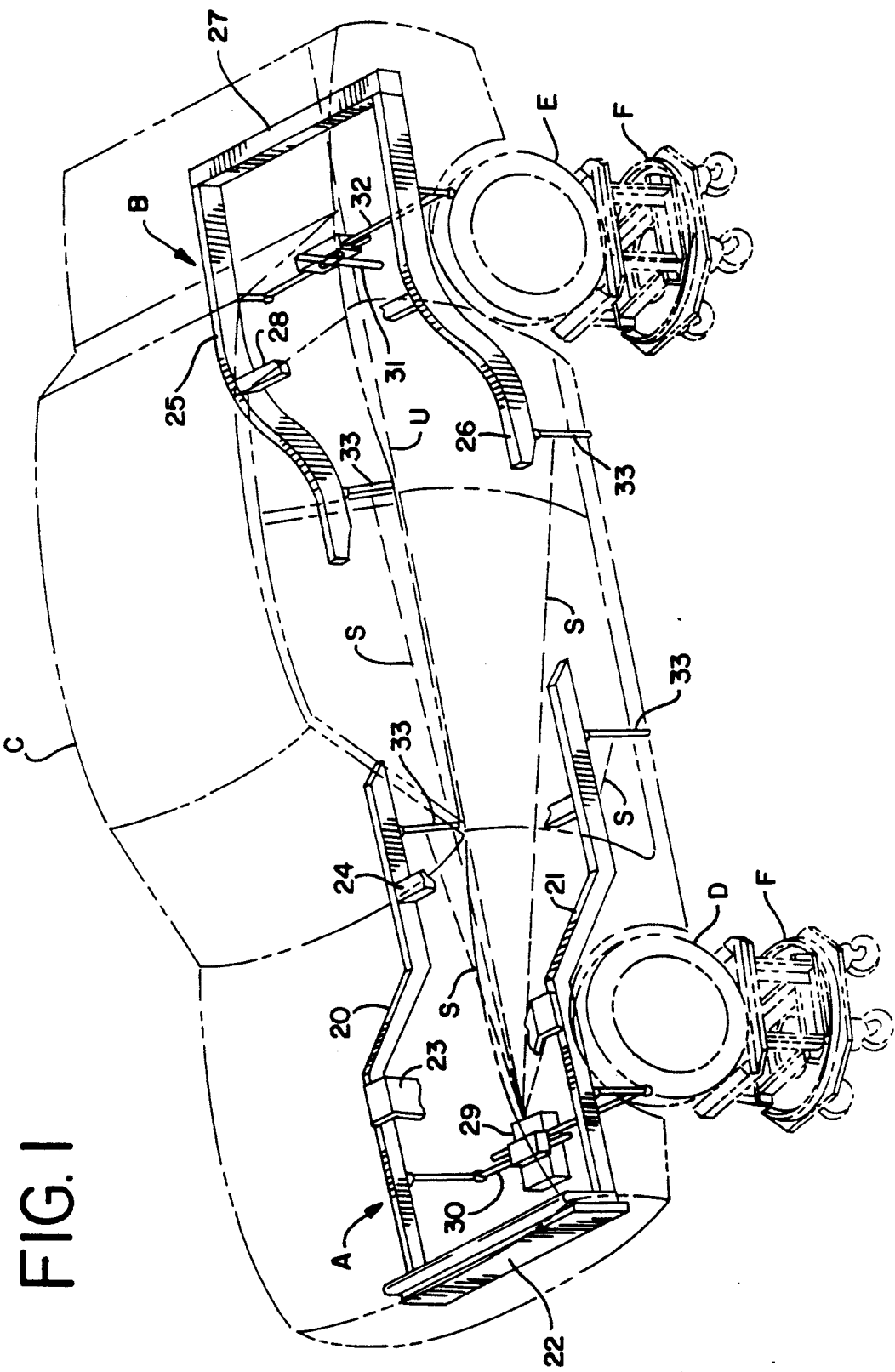
FIG. 1 is a partially schematic perspective view of typical sub-frames forming a part of a conventional form of vehicular unibody with the system of the present invention operatively mounted thereon, additional portions of the body being shown in phantom.
Figure 2:
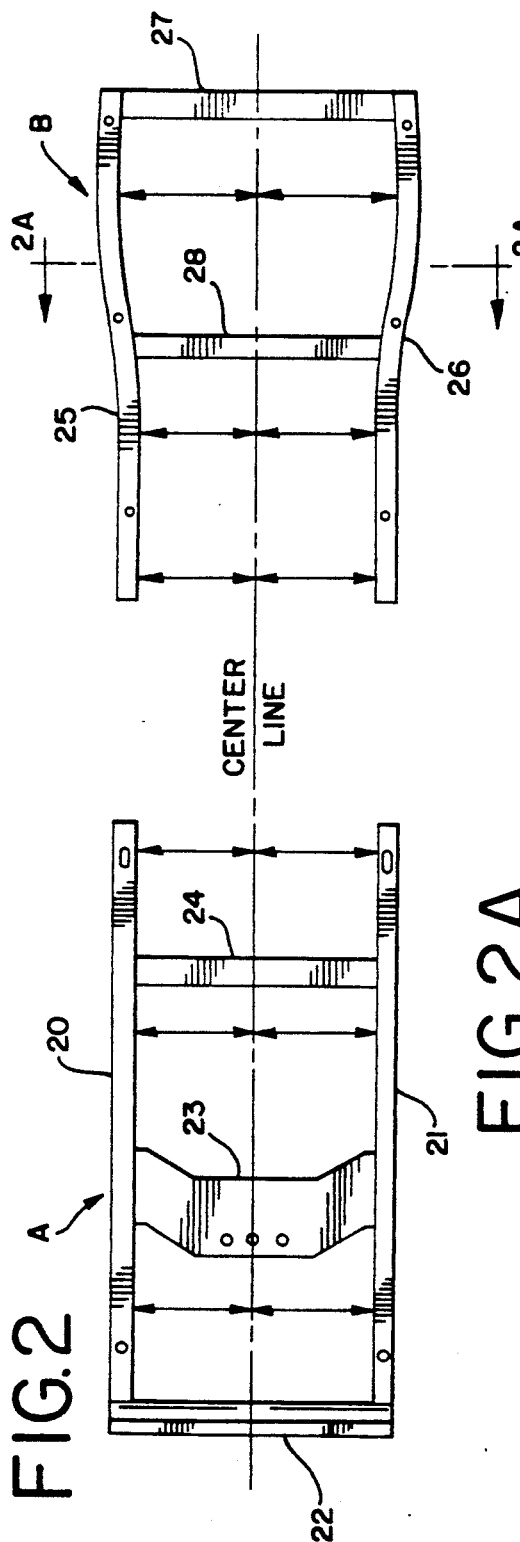
FIG. 2 is a top plan view on reduced scale of the sub-frames of FIG. 1.
Figure 3:
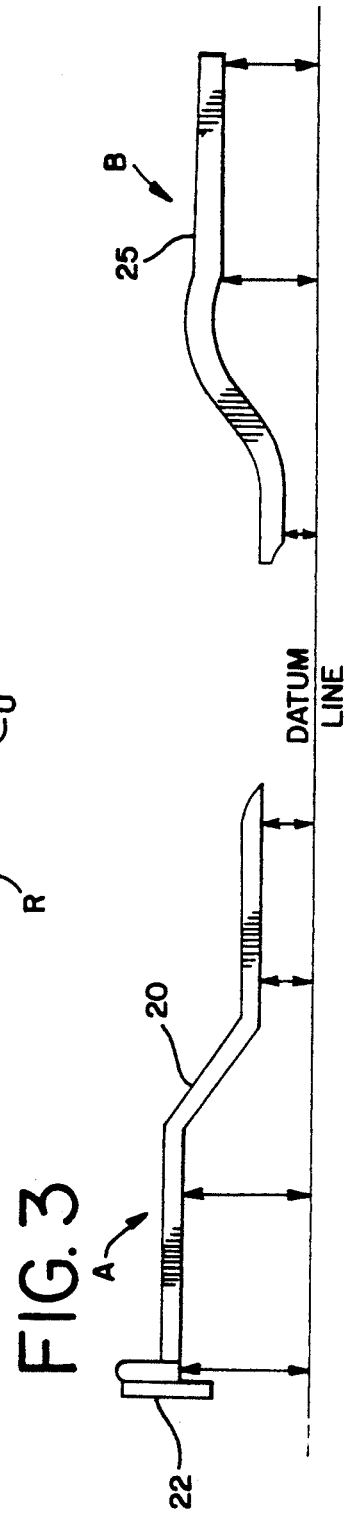
FIG. 3 is a side elevation on reduced scale of the sub-frames of FIG. 1.

FIGS. 1-3 illustrate a typical type of unibody sub-frame arrangement consisting of a front sub-frame A and rear sub-frame B. Sub-frame A is formed from side frame members 20 and 21 extending in parallel spaced relation from the front of vehicle body C, shown in phantom in FIG. 1, over the front wheels D and terminating short of the center of body C. Sub-frame A also includes front transverse frame member 22 and intermediate spacing members 23 and 24 which basically stabilize the spacing of frame members 20 and 21.

Rear sub-frame B similarly includes spaced parallel side frame members 25 and 26 extending forwardly from transverse frame member 27 over rear wheels E to just short of the center of body C. One or more stabilizing members 28 extend transversely between side frame members 25 and 26. This typical form of unit body design is basically completed by the connection of front and rear sub-frames A and B with an intermediate platform floor panel or pan and rocker panels (not shown) forming a part of body C.

It is intended herein to use the terms "frame" and "body" interchangeably considering that a unibody construction makes use of an integral frame and body. The term "chassis" is also broadly used even though some definitions limit its use to a combination of frame and wheels. The subject invention, as will become readily apparent, has utility with all types of symmetrical vehicle bodies, frames and chassis and no limitations should be implied by any use of these terms.

Referring in particular to FIG. 1, the entire vehicle body C, including all frame and body parts, is elevated in any suitable manner, such as by the use of wheel cradles F. FIG. 1 schematically illustrates the mounting of the alignment checking and correcting system of the invention under the vehicle body C and suspended therefrom within the marginal confines of the front and rear sub-frames A and B. This system includes an energy or laser beam generating means 29, suspension means 30 mounting the beam generator, at least one centerline target 31, suspension means 32 mounting the centerline target and a plurality of auxiliary targets 33 suitably suspended from selected body or frame parts.

The laser beam generator 29 may provide different beam projection functions as will be described. In one of its preferred forms, generator 29 selectively emits a unidirectional beam U or a sweeping beam S. Unidirectional beam U is aimed at and strikes the centerline target 31 while sweeping beam S periodically strikes the auxiliary targets 33. This sweeping action may be obtained by the beam either oscillating or rotating 360°.

As will be described in greater detail, centerline target 31 is preferably transparent and the auxiliary targets 33 are preferably opaque. While there are a number of laser beam generators suitable for use in the subject system, a generator that has been found fully functional is known as Laser Beacon 6000 available from Laser Alignment Inc., Grand Rapids, MI. This generator is a helium neon laser with a maximum output of 5 MW, a Class III (a) laser product, and includes controls permitting selection of unidirectional or sweeping (360° rotation) beam action. In either case the beam emitted is on the order of 0.4 mm in diameter.

In aligning a vehicle body it is necessary to measure the placement of various portions of the body in both horizontal and vertical planes or directions. Ordinarily a laser beam is invisible until interrupted, and then only visible at the point of interruption. Thus, unidirectional beam U will register on centerline target 31 to define a base for horizontal measurements and sweeping beam S will register on all of the auxiliary targets 33 to establish measurements in a vertical direction.

Beam generator 29 and centerline target 31 cooperate to define the longitudinal center of sub-frames A and B in the illustrative example shown in FIG. 1. Preferably, these elements of the system are mounted in undamaged or relatively undamaged areas of the sub-frames. Additionally, these elements are suspended equidistant between the laterally spaced frame or body portions which support them. Stated otherwise, in order to establish the true centerline of sub-frames A and B, or for that matter the true centerline for any portion of a vehicle undergoing alignment check and/or correction, it is essential that both the beam generator 29 as defined by the emitted beam itself, and the centerline target 31 be centered. This is accomplished by suspension means 30 and 32 in a manner to be described.

FIG. 2 illustrates the established centerline of sub-frames A and B. With both the beam generator 29 and centerline target 31 being suspended in undamaged areas equidistant from their respective side frame members, the centerline established is true even in areas where side frame members diverge or converge, rise or decline. This is because vehicle frames are designed to be symmetrical. Thus, the true centerline established permits measurements from opposite side frame members to the centerline as indicated by the arrows in FIG. 2. These measurements may be made manually as, for example, by using a tape measure and extending the same from the same point of reference on each side frame member inwardly into visible interruptive contact with the centerline beam U. Proper horizontal alignment is established once equal measurements from opposite side frame portions to the centerline are obtained.

Figure 2A:
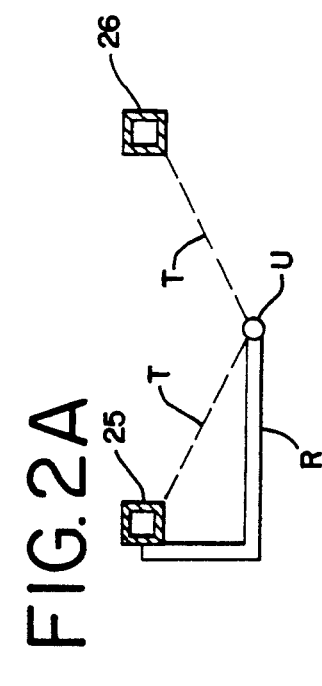
FIG. 2A is a cross-sectional view of the subframe taken along line 2A—2A in FIG. 2.

FIG. 2A illustrates the taking of measurements relative to the centerline beam U in an area of the frame where the position of the beam U is below the horizontal plane in which both frame portions of frame members 25 and 26 should reside. As can be seen from FIGS. 1 and 3, the rear portions of frame members 25 and 26 rise thus placing them well above the centerline beam U. Measurements by tape T diagonally from identical points on frame members 25 and 26 to the point of interruption of beam U may be relied upon to check horizontal spacing or a standard square R of the type associated with establishing right angles may be used in the manner illustrated. In either case, the obtaining of equal measurements from both side frame portions will establish proper horizontal spacing or, stated otherwise, elimination of side sway. This assumes, of course, proper vertical alignment of the side frame portions which is simultaneously checked and corrected as will be described.

FIG. 3 illustrates the establishing of a datum line to be used in obtaining measurements of side frame member positioning in a vertical direction. Sweeping beam S creates a series of such datum lines as a result of its visible contact with each auxiliary target 33. This function provides a reference point at each auxiliary target from which vertical positioning of that portion of the frame member located at each target may be determined. This series of datum lines also establishes a horizontal plane from which additional vertical measurements may be taken in areas where no auxiliary targets are located. As with horizontal measuring, a tape or rule may be extended from a frame portion into interruptive contact with beam S. Such vertical measurements are indicated by the arrows in FIG. 3. These measurements need not be done manually as each auxiliary target 33 may be provided with appropriate indicia as will be described to permit immediate comparison of the relative vertical positioning of oppositely positioned portions of side frame members.

With the system described it is possible to quickly and efficiently check and/or correct alignment. During correction the effect of body pulls can be readily observed and results quickly checked. Alignment can be completed without recalibration. When using a single beam generator as described hereinabove, the only adjustment to the system required is the switching between unidirectional and sweeping beam generation. With single beam use the centerline will reside in the horizontal plane defined by the sweeping datum line.

FIGS. 4–7 are directed to one form of suspension means 30 and 32 suitable for use in the subject system. Referring first to suspension means 30 shown in FIGS.

4 and 5, a pair of horizontally expanding and retracting parallel cross bars 34 and 35 project through a centrally located pinion gear housing 36 and at their outer ends are attached to vertically extending slide lock housings 37. Vertical hanging bars 38 are slidably received in housings 37.

Figure 6:
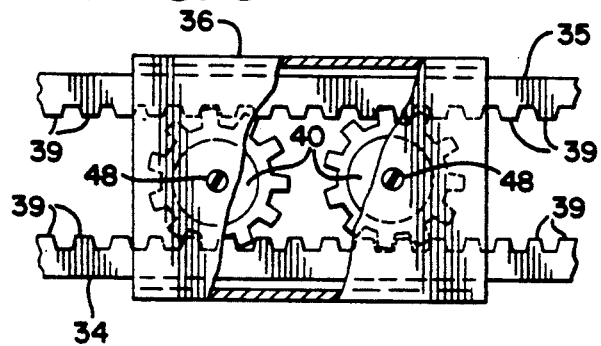
FIG. 6 is an enlarged top plan view of the gear housing of the suspension member with a portion of the housing broken away as viewed along line 6—6 in FIG. 4.

Each cross bar 34 and 35 is provided with pinion engaging teeth 39 along the inner vertical surface thereof. FIG. 6 illustrates pinion housing 36 as including a pair of side-by-side gears 40 provided with teeth meshing with the teeth 39 of cross bars 34 and 35. The cross bars, housing and gears cooperate to define a conventional form of rack and pinion arrangement whereby the housing 36 always remains centered between the outer ends of the cross bars, or in this case the slide lock housings 37, regardless of the extent to which the cross bars 34 and 35 are extended or retracted in a horizontal direction.

Figure 4:
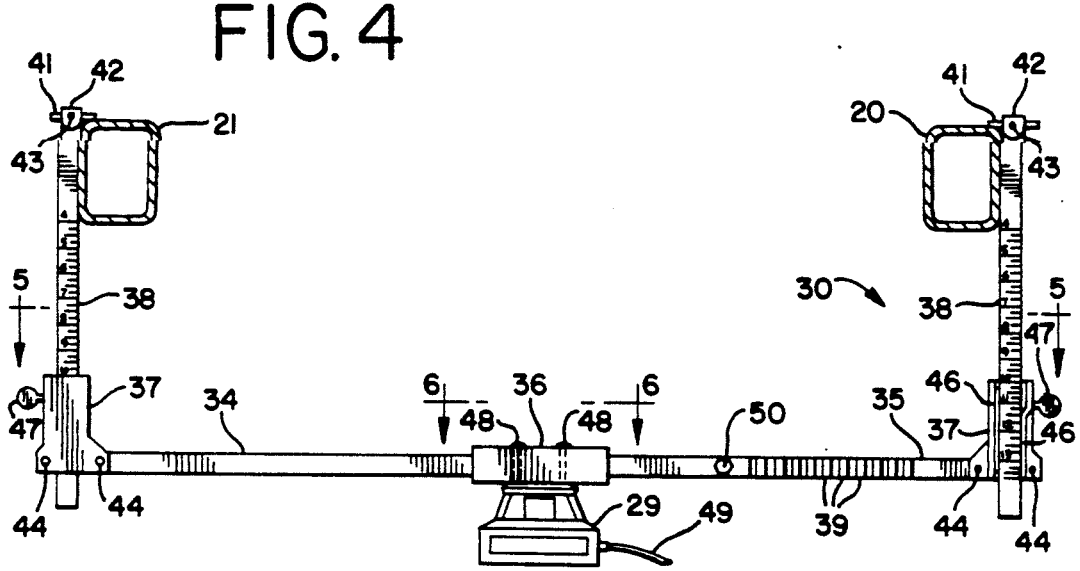
FIG. 4 is a front elevation of a suspension member mounted on sub-frame portions and supporting a laser beam generator thereon.
Figure 5:
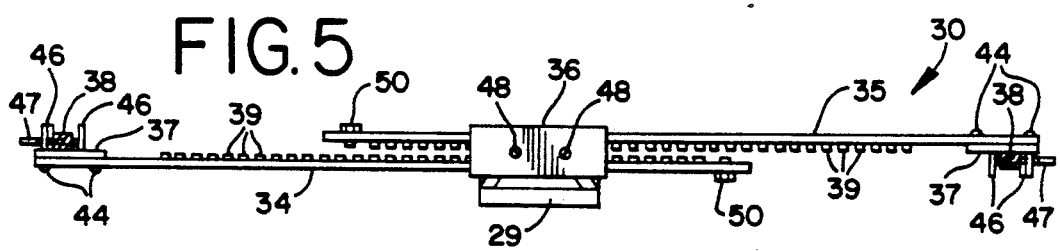
FIG. 5 is a partly sectioned top plan view of the suspension member of FIG. 4 taken along line 5—5 of FIG. 4.

The vertical hanging bars are identical in all respects. The upper end of each bar as shown in FIG. 4 may be provided with a transversely and outwardly projecting pin 41 held in place by an end strap 42 folded over the top end of the bar and attached to the bar by a rivet 43. That portion of the pin 41 projecting inwardly may rest on the top outer surface of a portion of a side frame member 20 and 21 to thus support suspension means 30 in downwardly hanging relation on the sub-frame A.

Each slide lock housing 37 is suitably attached by fasteners 44 to an outer end of a cross bar. The housing 37 is shaped to provide a vertically extending channel 45 defined by laterally spaced and opposed walls 46. A thumbscrew 47 extends inwardly through the outer wall 46 into engagement with the adjacent edge of a vertically hanging bar 38 which is slidingly received in the channel 45 into snug sliding engagement with the inner surfaces of opposed walls 46. In this manner the vertical positioning of the cross bars 34 and 35 may be selected by sliding the bars 38 through the housings 37 and locking the bars in place through use of the thumbscrews 47. Indicia in inch increments or the like may be carried on bars 38 to assist in leveling cross bars 34 and 35 during suspension of either beam generator 29 or centerline target 31.

The beam generator 29 is suitably attached to gear housing 36 so as to be maintained in centered relation with respect to the housings 37 and hanging bars 38. Beam generator 29 may be mounted above or below housing 36. Depending on the contour of a frame, the higher elevation of generator 29 may be desired. As shown, generator 29 is attached to the undersurface of housing 36 by fasteners 48 extending vertically through housing 36 and also mounting pinion gears 40 for rotation therein. Beam generator 29 may be operated by power cord 49 connected to a conventional 110 v supply or by a portable 12 v battery pack containing an appropriate converter.

Stops 50 in the form of short bolts or the like are received through the inner ends of the cross bars 34 and 35. These stops will engage opposite end surfaces of housing 36 to prevent excessive horizontal extension of the cross bars and disengagement thereof with the gears 40.

An alternative form of mounting suspension means 30 and 32 on a frame is shown in FIG. 7. Each slide lock housing 37 is provided with an elongated bolt 51 extending across channel 45 through opposed walls 46 in an inwardly direction. A stop block 52 is mounted on the bolt 51 to be placed in engagement with an outer bottom corner portion of sub-frame member 20.

Looking inwardly, the next element received on the bolt 51 is a spacer 53 followed by a U-shaped magnet 54. The magnet is held on the bolt 51 by an enlarged flange or washer 55 and a nut 56 completes the assembly. The poles of magnet 54 engage the bottom surface of the sub-frame member 20 and the suspension means 30 and 32 are magnetically supported. The parts 53 and 55 are formed from non-magnetic material to act as shields. This type of magnetic support may of course be present at both ends of suspension means 30 and 32.

FIG. 8 illustrates fragmentary portions of the centerline target 31 and suspension means 32. As previously described, suspension means 32 may be identical to beam generator suspension means 30 and suitably hung from the sub-frame or other parts in any appropriate manner such as those shown in FIGS. 4 or 7.

Preferably, target 31 is formed from transparent material to permit the laser beam directed at it to pass therethrough distortion free. Thus, a properly focused laser beam will not only identify its position on target 31, but will also pass through the target 31 retaining its focused condition so as to be usable for the type of measuring already described beyond target 31. If desired, multiple centerline targets may be used in damaged as well as undamaged areas, even beyond the chassis, in defining the requisite centerline and to assist in taking measurements. However, when mounting a centerline target in a damaged area, care must be taken to make sure that the integrity and accuracy of the centerline is maintained. Also, if availability of undamaged area is limited, the centerline target 31 may be mounted close to the beam generator 29. The passing of the beam through the target retains the centerline defining function well beyond the target.

The centerline target 31 may be att ached to gear housing 36 in any suitable manner. As illustrated in FIG. 8, a simple form of bracket 57 extends over the outer surface of the target and, in cooperation with the adjacent front surface of gear housing 36, confines the target against the housing. Fasteners 58 extend through projecting ears of bracket 57 into engagement with housing 36. The target 31 is vertically slidable in bracket 57 and against the housing 36 and thumbscrew 59 is operable through bracket 57 against the outer surface of target 3 to fix the target in a selected vertical position.

Suspension means appropriate for use in the subject system are commercially available. One form is known as an Arnwood gauge available from Kansas Jack, Inc., McPherson, KA. When modifying existing equipment, care must be taken to mount both the beam generator means 29 and the centerline target 31 so that the beam and target are on the true center of each suspension means 30 and 32.

FIGS. 9 and 10 illustrate a suitable form of auxiliary target 33. As previously mentioned, the body portion may be formed from any acceptable opaque material and may have the shape of a ruler or the like. One form of frame attachment means includes an upwardly directed magnet 60 having appropriate north (N) and south (S) poles interconnected by a narrow base receiving therearound an attaching band 61 of non-magnetic material with opposite ends attached to target 33 by a rivet 62. With this arrangement the auxiliary targets may be suspended from the frame or body parts at any desired location and may be readily moved to a new location. Targets 33 may be graduated as indicated to permit direct reading of vertical measurements under static or pulling conditions. Such readings are determined by the point of contact of sweeping beam S on each target. Of course, the auxiliary targets 33 may be mounted on the frame in any other suitable manner. One alternative form of mounting includes the use of jig holes.

FIGS. 11 and 12 graphically illustrate alternate combinations of laser beam generators. In FIG. ii a double laser beam generator 63 is shown as being capable of emitting a first horizontal unidirectional beam 64 intended to cooperate with a centerline target to define the centerline. A second horizontal sweeping beam 65 is projected below beam 64 to strike auxiliary targets and define the datum line. As an alternative to a double laser beam generator, a pair of independent beam generators may be mounted on gear housing 36, one on the top surface and the other on the bottom surface. With dual beam generation it is unnecessary to selectively switch a single generator between unidirectional and sweeping action.

The dual beam arrangement of FIG. 12 makes use of a generator 66 having a vertical sweeping beam 67 used to establish a vertically extending centerline plane in cooperation with a spaced centerline target and a horizontally sweeping beam 68 to cooperate with the auxiliary targets to define the horizontally extending datum line plane.

The arrangement of FIG. 12 not only eliminates selective switching but also permits the use of more than one centerline target arranged at various heights. Also, diagonal horizontal measurements can be avoided as direct horizontal tape measurements can be taken regardless of variations in sub-frame height because the point of measurement interruption of the vertically sweeping beam 67 can be readily determined at any sub-frame height. Again, if necessary, a pair of separate upper and lower beam generators may be attached to gear housing 36.

In checking and correcting vehicle alignment precision measurement is important. Accuracy on the order of ±1/16 inch is desired and can readily be obtained by use of the method and system of the subject invention. Vertical adjustability of suspension means 30 and 32 permits selective vertical placement of centerline beam U to maximize measurement accuracy.

The subject invention is effective with all types of frames, including "Diamond" shaped frames and tubular or tunnel section frames. Multiple reference points, both centerline and datum line, may be simultaneously and continuously observable and measurable throughout the repair process and at no time is recalibration of the system necessary. The results of pulls are immediately apparent thus providing a continuous update on repairs in progress. This permits improved efficiency in planning pulls.

With the system suspended directly from the frame or body parts the vehicle wheels need not be removed thus reducing the total time consumed. Actually, the equipment calibrates to the vehicle in seconds and the total set-up time is less than 5 minutes. Additionally, no special support equipment in the form of platforms or the like is needed for the components of the system. Thus, ready access to damaged areas is available.

By mounting the laser beam generator 29 in an undamaged area the most expensive part of the necessary equipment is well protected while eliminating the necessity of moving the generator and recalibrating the same during operation of the system. The system is operative when the vehicle is supported on any reasonably level surface. The use of conventional wheel cradles F adequately elevates the vehicle for access thereunder while retaining the vehicle within easy reach of standard floor anchors which function to hold the vehicle during pulling.

The method and system of the subject invention are effective in checking and correcting alignment of upper body portions as well as strut towers, floor pans, suspension parts and attaching locations therefor. The method and system are very cost-effective not only with respect to initial investment but also by saving labor time and thereby increasing productivity. No expensive and complexing equipment, such as a computer, is required. Manufacturer and after-market dimension charts or other information are not required. No special database is required. The method and system automatically adjust to frames of different widths and depend on frame symmetry to obtain highly accurate results in a very economical manner.

While certain embodiments of the invention have been shown and described, it will be obvious to those skilled in the art that changes and modifications may be made without departing from the invention in its broader aspects, and, therefore, it is intended that the appended claims cover all such changes and modifications as fall within the true spirit and scope of the invention.

I claim:

1. A method of checking and correcting vehicle body alignment comprising:
   (a) positioning a means for generating one or more transmitted data reference laser beams or the like in equidistant relation with laterally spaced portions of a vehicle body to direct said beams along said body;
   (b) positioning at least one centerline reference beam target in equidistant relation with said laterally spaced portions of said vehicle body in centerline defining relation with said beam generating means;
   (c) positioning auxiliary reference beam targets on said vehicle body in spaced relation with said beam generating means; and
   (d) operating said beam generating means to establish visually observable contact of a beam with said centerline target to create a continuous centerline in the form of an interruptably observable light extending longitudinally of said vehicle body to permit at least generally horizontally directed measurements from selected points of beam interruption to said laterally spaced portions, said horizontally directed measurements occurring at or spaced from said centerline target, and to simultaneously establish a sequentially and continuously moving repetitive visually observable contact of a beam with said auxiliary targets to create a pattern of interruptably observable light sweeping said auxiliary targets to permit body measurements in a vertical direction at said auxiliary targets as well as from selected points of beam interruption spaced from said auxiliary targets.

2. The method of claim 1, wherein said beam generating means is alternatively operated to selectively establish a fixed centerline target or a sweeping auxiliary target beam.

3. The method of claim 1, wherein said beam generating means and said centerline target are positioned within the confines of said body between similar undamaged laterally spaced portions of said body.

4. The method of claim 3, wherein said centerline beam target permits transmission of said beam therethrough to provide for body measurements in said horizontal direction beyond said centerline beam target.

5. The method of claim 1, wherein said beam generating means simultaneously provides a first centerline target contacting beam and a second auxiliary target contacting beam.

6. The method of claim 5, wherein at least said second beam is continuously moving to provide an auxiliary target sweeping pattern.

7. The method of claim 6, wherein both said fist and second beams are continuously moving to provide target sweeping patterns.

8. A method of checking and correcting vehicle body alignment comprising:
  (a) positioning means for generating one or more transmitted data reference laser beams or the like in equidistant relation with laterally spaced portions of a vehicle body to direct said beams along said body;
  (b) positioning at least one centerline reference beam target in equidistant relation with said laterally spaced portions of said vehicle body in centerline defining relation with said beam generating means;
  (c) positioning auxiliary reference beam targets on said vehicle body in spaced relation with said beam generating means;
  (d) operating said beam generating means to establish a first beam extending into visually observable light contact with said centerline target;
  (e) operating said beam generating means to establish a second beam extending into visually observable light contact with said auxiliary targets;
  (f) measuring the distance between said fist beam and longitudinally corresponding laterally spaced portions of said vehicle body to determine the horizontal spacing of said laterally spaced portions at any selected location longitudinally of said vehicle body including locations spaced from said centerline target; and
  (g) measuring the vertical distance between said second beam and adjacent portions of aid vehicle body at any selected location longitudinally of said vehicle body including locations spaced from any of said auxiliary targets, those measurements taken in locations spaced from said targets being carried out by physically at least in part interrupting said beams and determining the respective horizontal or vertical distances between the points of beam interruption and the closest portions of said vehicle body being subjected to measurement.

9. The method of claim 8 wherein said first beam is fixed and said second beam is operated to provide a continuously moving horizontally directed sweeping action.

10. The method of claim 8 wherein said first and second beams are operated to provide continuously moving vertically and horizontally directed sweeping actions, respectively.

11. The method of claim 8 wherein said centerline target permits transmission of said first beam therethrough in continuous centerline defining relation beyond said centerline target.

* * * * *

UNITED STATES PATENT AND TRADEMARK OFFICE
CERTIFICATE OF CORRECTION

PATENT NO. : 5,207,002

DATED : May 4, 1993

INVENTOR(S) : Steven V. Humblet

It is certified that error appears in the above-identified patent and that said Letters Patent is hereby corrected as shown below:

Col. 6, line 37, "att ached" should read --attached--; line 47, "3" should read --31--.

Col. 7, line 10, "ii" should read --11--.

Col. 9, line 16, "fist" should read --first--.

Col. 10, line 7, "fist" should read --first--; line 15, "aid" should read --said--.

Signed and Sealed this

Fifteenth Day of February, 1994

Attest:

BRUCE LEHMAN

*Attesting Officer*      Commissioner of Patents and Trademarks